UNITED STATES PATENT OFFICE.

EMERICH SZARVASY, OF BUDAPEST, HUNGARY.

PROCESS FOR THE PRODUCTION OF FINE SOOT SUITABLE FOR THE MANUFACTURE OF PIGMENTS.

1,383,674.

Specification of Letters Patent. Patented July 5, 1921.

No Drawing. Application filed June 3, 1920. Serial No. 386,408.

*To all whom it may concern:*

Be it known that I, EMERICH SZARVASY, a citizen of Hungary, residing at Budapest, Hungary, have invented certain new and useful Improvements in Processes for the Production of Fine Soot Suitable for the Manufacture of Pigments, for which I have filed applications in Hungary, July 18, 1918; Germany, July 23, 1918, of which the following is a specification.

My invention refers to the production of soot and more especially fine soot adapted for use in the manufacture of pigments.

It is well known to produce soot of the fineness required for the manufacture of pigments by the incomplete cumbustion of hydrocarbons. Such processes are however comparatively wearisome and uneconomical.

According to the present invention the production of soot instead of being effected by incomplete combustion, is effected by the splitting up of methane by heat.

It is well known that if methane is caused to pass through chambers heated to a sufficiently high degree, it will split up and deposit carbon. The freed carbon is however deposited upon the heated surfaces, for the greater part in a graphitic form, and in so far as soot is formed, it has not the fineness which would render it suitable for use in the manufacture of pigments, particularly the better quality printing pigments.

I have now discovered that the formation of soot can be promoted and the fineness of the separated soot can be increased by diluting the methane, that is to be subjected to the heat-splitting operation, with neutral gases, that is to say, gases that do not produce carbon, such as for instance nitrogen or hydrogen, and thus diminishing the partial pressure of the methane.

The soot produced in this manner is extremely fine so that it is suitable for the manufacture of the finest printing pigments, and owing to its extremely fine sub-division, that is to say, great covering capacity, it can be employed also with advantage as an absorbing or adsorbing agent.

A particularly effective means is the dilution with carbonic acid gas which is decomposed at the reaction temperature into carbon monoxid and oxygen, which likewise combines with the carbon to form carbon monoxid and thus produces a considerable increase of volume during the reaction.

I claim:

1. The process, which consists in diluting methane with a neutral gas and subjecting the mixture to a heat treatment, whereby the methane is split up.

2. The process, which consists in diluting methane with a neutral gas that does not deposit carbon and subjecting the mixture to a heat treatment, whereby the methane is split up.

3. The process, which consists in diluting methane with carbonic acid gas and subjecting the mixture to a heat treatment, whereby the methane is split up.

In testimony whereof I have signed my name to this specification.

EMERICH SZARVASY.

Witnesses:
CHAS. MEDQYES,
EUGENE HARSANYI.